(12) United States Patent (10) Patent No.: US 12,595,014 B2

Shih (45) Date of Patent: Apr. 7, 2026

(54) FOOT PEG ASSEMBLY

(71) Applicant: PIVOTRACK LLC, Fullerton, CA (US)

(72) Inventor: Ming-Hung Shih, Taichung (TW)

(73) Assignee: PIVOTRACK LLC, Fullerton, CA (US)

( * ) Notice: Subject to any disclaimer, the term of this patent is extended or adjusted under 35 U.S.C. 154(b) by 383 days.

(21) Appl. No.: 18/376,004

(22) Filed: Oct. 3, 2023

(65) Prior Publication Data

US 2025/0033726 A1 Jan. 30, 2025

(30) Foreign Application Priority Data

Jul. 28, 2023 (TW) ................................. 112128438

(51) Int. Cl.
B62J 25/00 (2020.01)

(52) U.S. Cl.
CPC ..................................... B62J 25/00 (2013.01)

(58) Field of Classification Search
CPC ................................. B62J 25/00; B62J 25/06
See application file for complete search history.

(56) References Cited

U.S. PATENT DOCUMENTS

| | | | | | |
|---|---|---|---|---|---|
| 3,709,058 | A | * | 1/1973 | Pawsat | B62M 3/12 |
| | | | | | 74/594.4 |
| 7,497,291 | B1 | * | 3/2009 | McKim | B62J 25/04 |
| | | | | | 280/291 |
| 7,946,193 | B2 | * | 5/2011 | Smith | B62J 25/06 |
| | | | | | 74/564 |
| 9,540,066 | B1 | | 1/2017 | Bloomer | |
| 10,569,826 | B1 | * | 2/2020 | Shaffir | B62J 25/00 |
| 11,401,001 | B1 | | 8/2022 | Hsieh | |
| 2015/0130162 | A1 | * | 5/2015 | Grose | B62M 3/08 |
| | | | | | 280/291 |
| 2018/0099716 | A1 | | 4/2018 | Hon | |
| 2022/0281548 | A1 | * | 9/2022 | Kaeb | B62J 25/06 |

FOREIGN PATENT DOCUMENTS

| | | | | | | |
|---|---|---|---|---|---|---|
| CN | 109649546 | A | * | 4/2019 | | B62J 25/00 |
| DE | 202014002485 | U1 | * | 4/2014 | | B62J 25/06 |
| DE | 102021100714 | A1 | * | 7/2022 | | B62J 25/06 |
| WO | WO-2010151753 | A1 | * | 12/2010 | | B62J 25/04 |

* cited by examiner

*Primary Examiner* — Drew J Brown
(74) *Attorney, Agent, or Firm* — WPAT, PC

(57) ABSTRACT

A foot peg assembly comprises a main body, an extension element and a cover body. The main body comprises a predetermined portion, the extension element is configured to be installed to the main body, so that an extension portion of the extension element exceeds the predetermined portion of the main body by a predetermined distance, and the cover body is configured to fix the extension element to the main body.

16 Claims, 5 Drawing Sheets

FOOT PEG ASSEMBLY

CROSS-REFERENCE TO RELATED APPLICATION

This application claims priority to and the benefit of Taiwan Patent Application Ser. No. 112128438, filed on Jul. 28, 2023, the entirety of which is incorporated by reference herein.

FIELD

The present invention relates to a foot peg, and more particularly to a foot peg assembly for supporting a rider's foot while the rider is sitting or standing on a motorbike.

BACKGROUND

A saddle-type vehicle usually refers to a vehicle used for so-called recreational and racing activities on unpaved trails and undeveloped terrain. Take an off-road motorcycle as an example, the off-road motorcycle is equipped with foot pegs on both sides of the frame of the motorcycle. When a rider rides the motorcycle at a high speed and makes a turn at an extreme angle, the rider's feet can rest on the foot pegs for supporting the rider's body so as to help the rider to lean or turn the motorcycle. Further, in the performance sport of a so-called extreme off-road motorcycle, in order for the rider to show various wonderful performance postures on the motorcycle, the foot peg is even more important to the rider.

Therefore, as market demands vary, how to develop an innovative foot peg product has become an issue that cannot be ignored.

SUMMARY

The present invention relates to a foot peg assembly that can be pedaled when a rider rides a motorbike.

According to one aspect of the present invention, a foot peg assembly used for a motorbike is provided. The foot peg assembly includes a main body, a first extension element and a cover body. The main body is configured to be installed to the motorbike. The main body includes a first predetermined portion and defines a first space; the first extension element includes a first extension portion and a first installation portion, wherein the first installation portion is configured to be installed into the first space defined by the main body, so that the first extension portion exceeds the first predetermined portion of the main body; and the cover body is configured to fix the first extension element to the main body.

Preferably, the foot peg assembly further includes a second extension element, wherein the main body further includes a second predetermined portion and further defines a second space; the second extension element includes a second extension portion and a second installation portion, wherein the second installation portion is configured to be installed into the second space defined by the main body, so that the second extension portion exceeds the second predetermined portion of the main body; and the cover body is further configured to fix the second extension element to the main body.

Preferably, the second predetermined portion and the first predetermined portion are substantially parallel and opposite to each other.

Preferably, the first extension element and the second extension element are detachably installed to the main body through the first installation portion and the second installation portion respectively.

Preferably, the main body further includes an intermediate portion located between the first predetermined portion and the second predetermined portion; the first predetermined portion and the intermediate portion define the first space therebetween for accommodating the first installation portion of the first extension element; and the second predetermined portion and the intermediate portion define the second space therebetween for accommodating the second installation portion of the second extension element.

Preferably, the cover body is detachably installed to the main body, and the first installation portion of the first extension element and the second installation portion of the second extension element are sandwiched between the main body and the cover body.

Preferably, the cover body, the first extension element and the second extension element are respectively provided with a plurality of anti-slip features.

Preferably, the shapes of the first installation portion and the second installation portion have substantially the same contour, so that the first installation portion and the second installation portion are able to be alternately installed to the first space and the second space.

Preferably, the foot peg assembly further comprises an adjustment base, and the adjustment base includes a first connecting portion and a second connecting portion, wherein the first connecting portion is configured to be connected to the motorbike; the second connecting portion includes a first adjustment structure; and the main body further includes a second adjustment structure, and the first adjustment structure and the second adjustment structure match each other so that the second adjustment structure of the main body can engage with the first adjustment structure at a predetermined angle.

Preferably, the first adjustment structure is a wheel portion, and the wheel portion has a periphery provided with a plurality of protruding segments and a plurality of concave segments, wherein the plurality of protruding segments and the plurality of concave segments are staggered with each other; and the second adjustment structure includes an installation space, and at least two protruding ribs are provided in the installation space, wherein the at least two protruding ribs are configured to respectively engage with at least two corresponding concave segments of the plurality of concave segments.

DETAILED DESCRIPTION OF THE PREFERRED EMBODIMENTS

Figure 3:
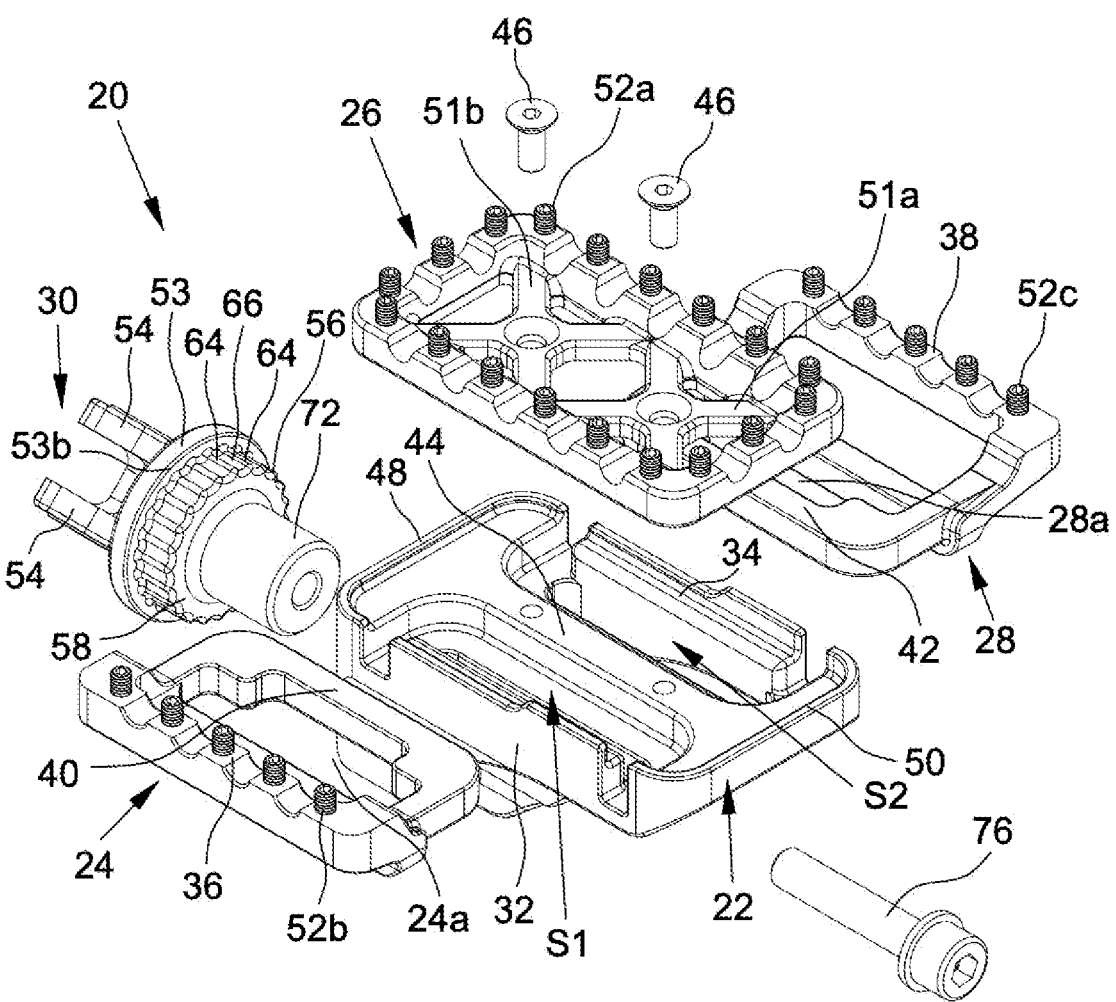
FIG. 3 shows an assembled schematic view of a foot peg assembly from a second perspective according to an embodiment of the present invention.
Figure 4:
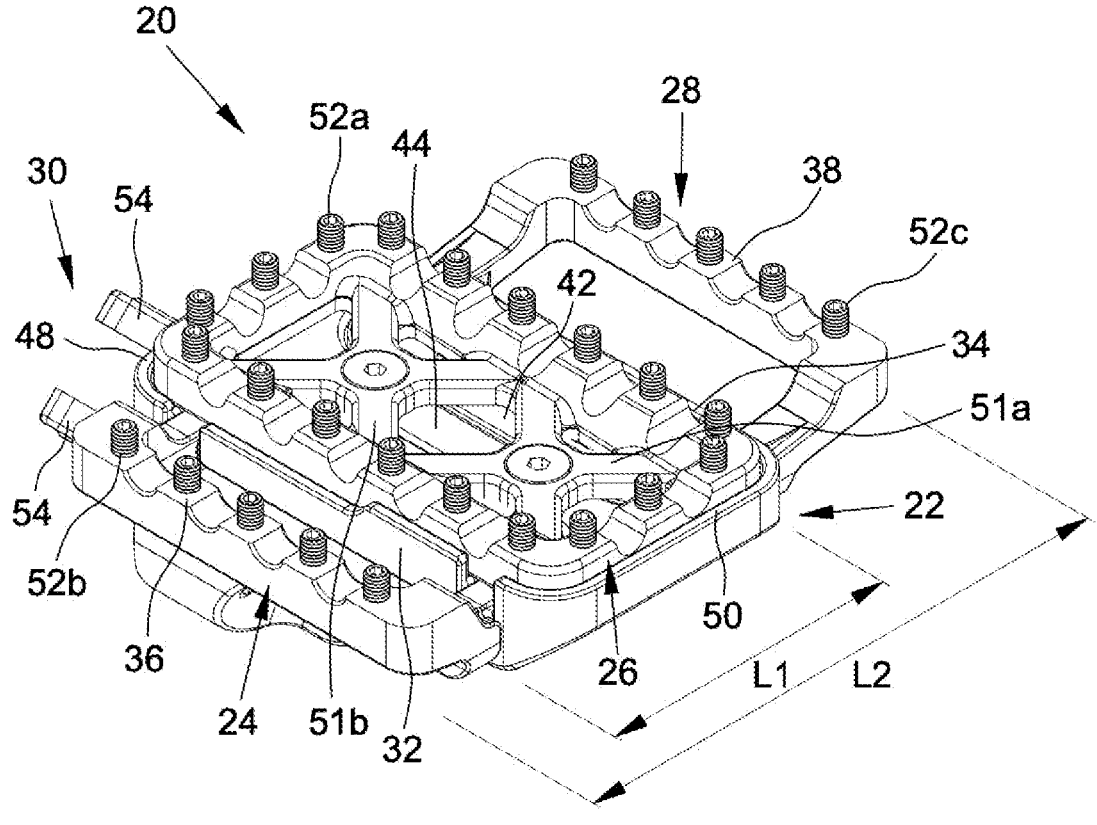
FIG. 4 shows an exploded schematic view of the foot peg assembly from the second perspective according to the embodiment of the present invention.
Figure 5:
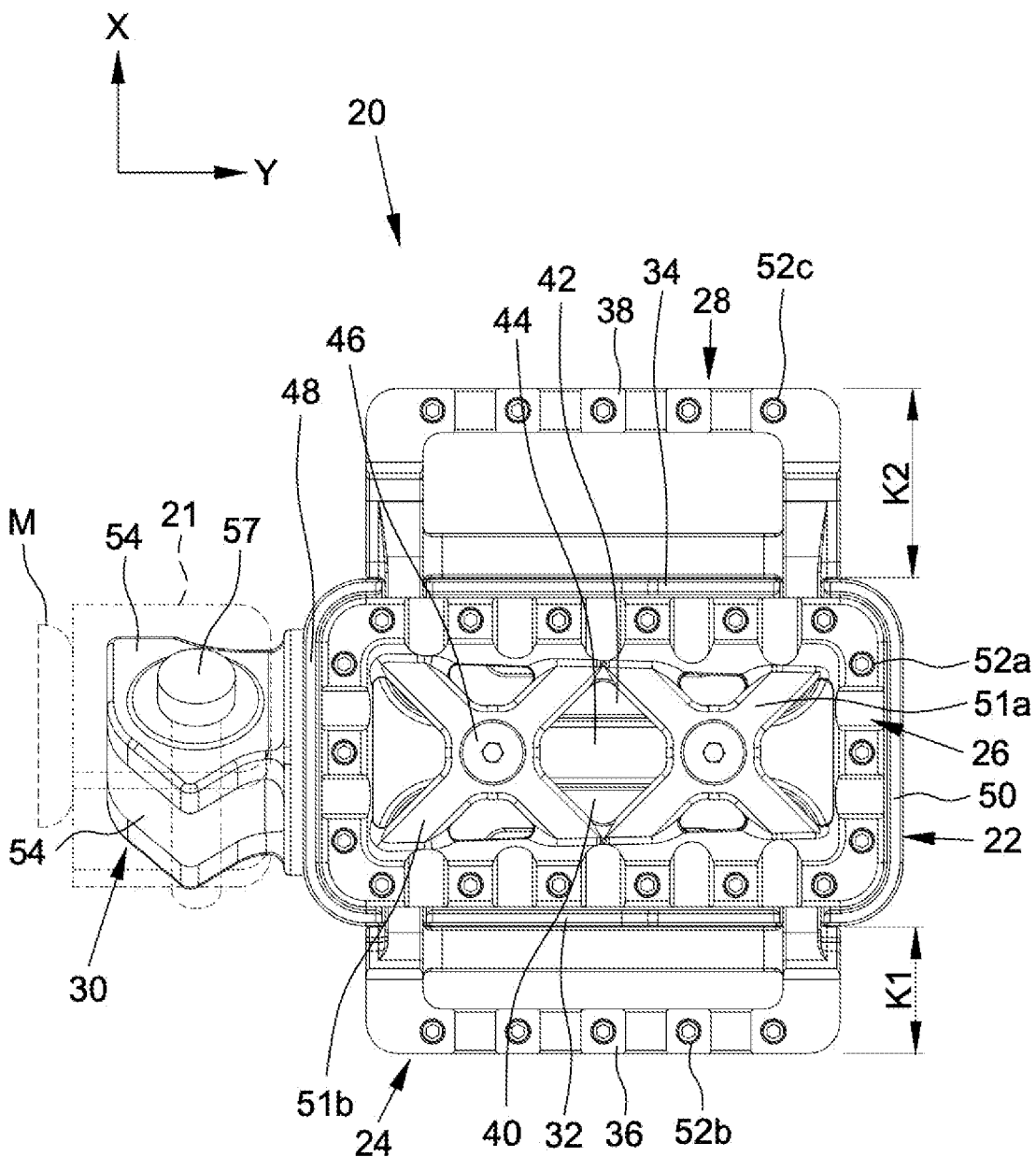
FIG. 5 shows a top schematic view of the foot peg assembly according to the embodiment of the present invention.

As shown in FIG. 1 to FIG. 5, a foot peg assembly 20 according to an embodiment of the present invention is used for a frame 21 of a motorbike (such as an off-road motorcycle) M (as shown in FIG. 5), but the implementation is not limited thereto. In the present embodiment, the X-axis represents a longitudinal direction (for example, the front and rear direction of the foot peg assembly 20 or the motorbike M), and the Y-axis represents a transverse or lateral direction (for example, the left and right direction of the foot peg assembly 20 or the motorbike M), and the Z-axis represents a vertical direction (for example, the height direction of the foot peg assembly 20 or the motorbike M). These axes can be seen in conjunction with FIG. 1 and FIG. 5.

The foot peg assembly 20 includes a main body 22, a first extension element 24 and a cover body 26. Preferably, the foot peg assembly 20 further includes a second extension element 28 and an adjustment base 30.

The main body 22 is configured to be installed to the motorbike M. For example, the main body 22 is installed on the motorbike M through the adjustment base 30 (as shown in FIG. 5). Furthermore, the main body 22 includes a first predetermined portion 32 and preferably further includes a second predetermined portion 34, and the second predetermined portion 34 and the first predetermined portion 32 are substantially parallel and opposite to each other. For example, the first predetermined portion 32 and the second predetermined portion 34 are respectively a rear portion and a front portion of the main body 22, but the implementation is not limited thereto.

The first extension element 24 includes a first extension portion 36 and a first installation portion 40, and the first extension portion 36 and the first installation portion 40 are connected to each other and define a first opening 24*a*. The second extension element 28 includes a second extension portion 38 and a second installation portion 42, and the second extension portion 38 and the second installation portion 42 are connected to each other and define a second opening 28*a*. The first extension element 24 is configured to be installed to the main body 22, so that the first extension portion 36 of the first extension element 24 exceeds the first predetermined portion 32 of the main body 22 by a first predetermined distance K1 (as shown in FIG. 5). Similarly, the second extension element 28 is configured to be installed to the main body 22, so that the second extension portion 38 of the second extension element 28 exceeds the second predetermined portion 34 of the main body 22 by a second predetermined distance K2 (as shown in FIG. 5).

The cover body 26 is configured to fix the first extension element 24 and the second extension element 28 to the main body 22.

Preferably, the first extension element 24 and the second extension element 28 are detachably installed to the main body 22 through the first installation portion 40 and the second installation portion 42 respectively.

Figure 2:
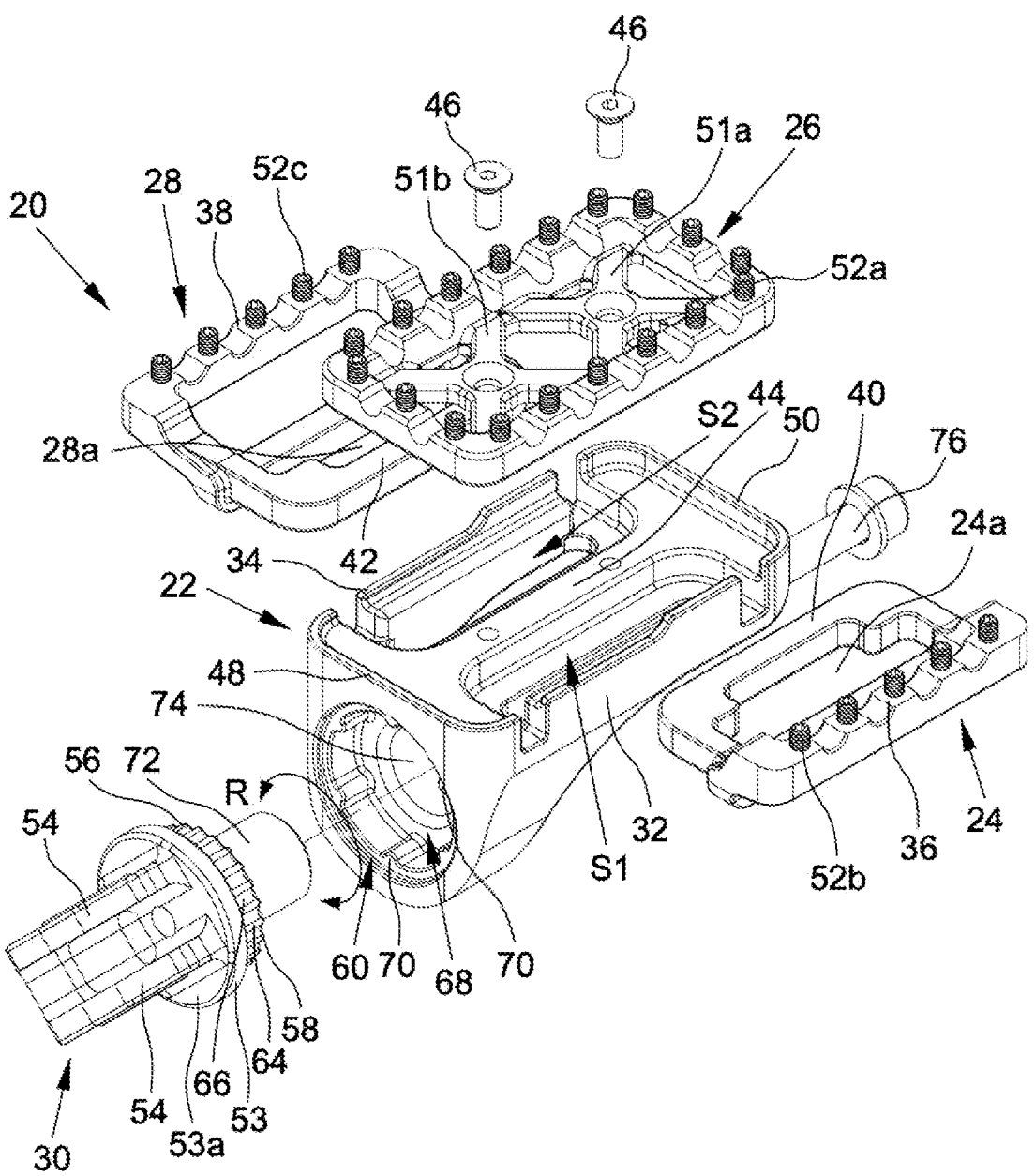
FIG. 2 shows an exploded schematic view of the foot peg assembly from the first perspective according to the embodiment of the present invention.

Preferably, the main body 22 further includes an intermediate portion 44 located between the first predetermined portion 32 and the second predetermined portion 34. The first predetermined portion 32 and the intermediate portion 44 define a first space S1 therebetween (as shown in FIG. 2 and FIG. 3), and the first space S1 is configured to accommodate the first installation portion 40 of the first extension element 24. The second predetermined portion 34 and the intermediate portion 44 define a second space S2 therebetween (as shown in FIG. 2 and FIG. 3), and the second space S2 is configured to accommodate the second installation portion 42 of the second extension element 28.

Figure 1:
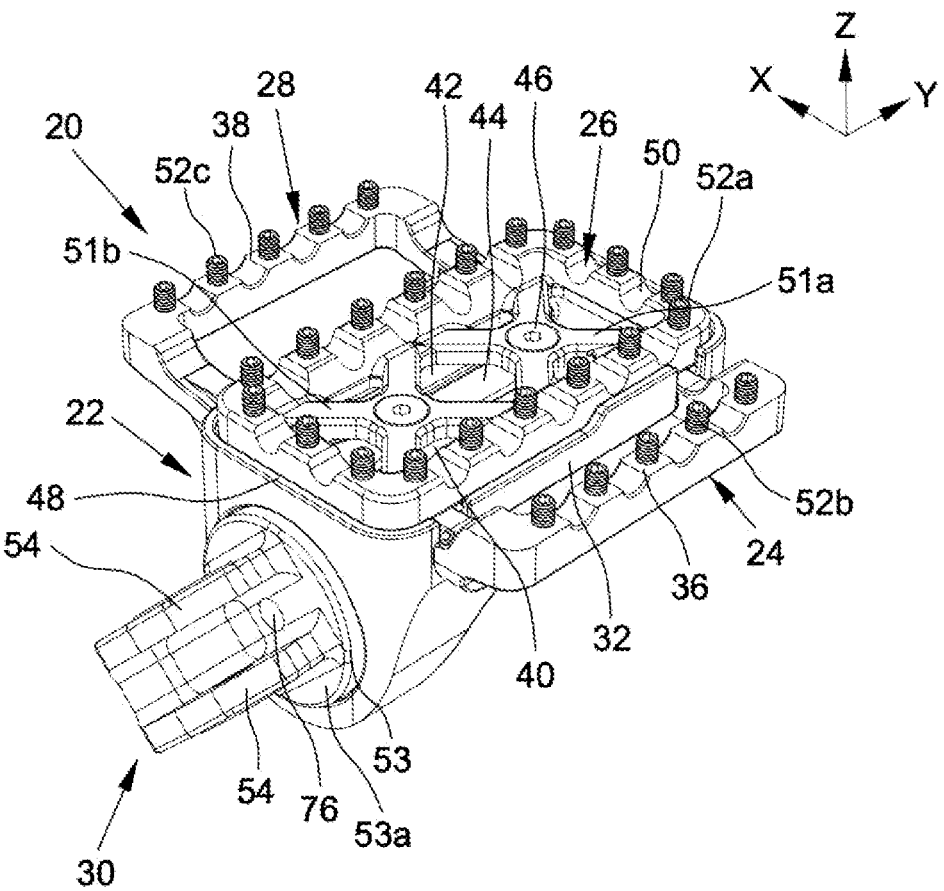
FIG. 1 shows an assembled schematic view of a foot peg assembly from a first perspective according to an embodiment of the present invention.

Preferably, after the first installation portion 40 of the first extension element 24 is installed to the first space S1 in the main body 22, the first installation portion 40 is clamped between the intermediate portion 44 of the main body 22 and the first predetermined portion 32 while the first predetermined portion 32 is clamped in the first opening 24*a* of the first extension element 24, so that the first extension element 24 exceeds the first predetermined portion 32 of the main body 22 (as shown in FIG. 1, FIG. 4 and FIG. 5). Similarly, after the second installation portion 42 of the second extension element 28 is installed to the second space S2 in the main body 22, the second installation portion 42 is clamped between the intermediate portion 44 of the main body 22 and the second predetermined portion 34 while the second predetermined portion 34 is clamped in the second opening 28*a* of the second extension element 28, so that the second extension element 28 exceeds the second predetermined portion 34 of the main body 22 (as shown in FIG. 1, FIG. 4 and FIG. 5).

Preferably, when the cover body 26 is detachably installed to the main body 22, the first installation portion 40 of the first extension element 24 and the second installation portion 42 of the second extension element 28 are sandwiched between the main body 22 and the cover body 26 in a vertical direction (or a Z-axis direction as shown in FIG. 1) while the first extension portion 36 of the first extension element 24 and the second extension portion 38 of the second extension element 28 are exposed outside the main body 22. Furthermore, the cover body 26 is detachably locked to the intermediate portion 44 of the main body 22 through at least one locking element 46 (such as a screw or a bolt, but not limited thereto). Alternatively, the cover body 26 can be detachably mounted to the main body 22 through buckling or snapping means, but the implementation is not limited thereto.

Preferably, the shapes of the first installation portion 40 and the second installation portion 42 can have substantially the same contour (e.g., U-shaped contour), so that the first installation portion 40 and the second installation portion 42 are able to be alternately installed to the first space S1 and the second space S2.

Preferably, the main body 22 further includes a third predetermined portion 48 and a fourth predetermined portion 50 in addition to the first predetermined portion 32 and the second predetermined portion 34. The fourth predetermined portion 50 and the third predetermined portion 48 are substantially parallel and opposite to each other. For example, the third predetermined portion 48 and the fourth predetermined portion 50 are respectively a left portion and a right portion of the main body 22, but the implementation is not limited thereto. The first predetermined portion 32, the second predetermined portion 34, the third predetermined portion 48 and the fourth predetermined portion 50 of the main body 22 jointly define a quadrilateral contour. Similarly, the cover body 26 includes four frame sides that jointly define another quadrilateral contour slightly smaller than the quadrilateral contour of the main body 22, so that the contour of the cover body 26 can match within the contour of the main body 22 when the cover body 26 is attached to the main body 22. It should be noted that, in other alternative embodiments, the quadrilateral contour of the cover body 26 is slightly larger than the quadrilateral contour of the main body 22, so that the contour of the cover body 26 can match outside the contour of the main body 22 when the cover body 26 is attached to the main body 22. In addition, the contours of the cover body 26 and the main body 22 can also be other polygons or other geometric shapes and are not limited to quadrilateral contours.

Preferably, the cover body 26 further includes a plurality of reinforcing portions arranged within the quadrilateral contour thereof. In the present embodiment, the plurality of reinforcing portions include at least a first reinforcing portion 51a and a second reinforcing portion 51b, and the first reinforcing portion 51a and the second reinforcing portion 51b are generally in an "X" shape and connected to at least one part of the four frame sides of the cover body 26, thereby improving the structural strength of the cover body 26.

Preferably, the cover body 26, the first extension portion 36 of the first extension element 24 and the second extension portion 38 of the second extension element 28 are respectively provided with a plurality of anti-slip features. Furthermore, the cover body 26 is provided with a plurality of first anti-slip features 52a, the first extension portion 36 of the first extension element 24 is provided with a plurality of second anti-slip features 52b, and the second extension portion 38 of the second extension element 28 is provided with a plurality of third anti-slip features 52c. These anti-slip features 52a, 52b, 52c are, for example, detachable protrusions that are used to generate friction with the bottom of boots or shoes worn by a rider and have an anti-slip effect. In the present embodiment, the first reinforcing portion 51a and the second reinforcing portion 51b are surrounded by the plurality of first anti-slip features 52a.

Preferably, the adjustment base 30 at least includes a base portion 53, a first connecting portion 54 and a second connecting portion 56. The base portion 53 has a first plane 53a and a second plane 53b facing away from the first plane 53a. The first connecting portion 54 is provided on the first plane 53a of the base portion 53 and configured to be connected to the motorbike M. For example, the first connecting portion 54 can be a U-shaped clevis having at least one through hole and is fixed to the frame of the motorbike M through an auxiliary component 57 (such as a screw or a bolt, but not limited thereto) passing through the at least one through hole (as shown in FIG. 5), but the implementation is not limited thereto. On the other hand, the second connecting portion 56 is provided on the second plane 53b of the base portion 53. The second connecting portion 56 of the adjustment base 30 includes a first adjustment structure 58, and the main body 22 further includes a second adjustment structure 60. The first adjustment structure 58 of the second connecting portion 56 and the second adjustment structure 60 of the main body 22 match each other, so that the second adjustment structure 60 of the main body 22 can engage with the first adjustment structure 58 at a predetermined angle (as shown in FIG. 2). Therefore, with the first adjustment structure 58 and the second adjustment structure 60, the rider can rotate the main body 22 to a predetermined angle in a predetermined direction R according to his/her own preferences or habits (for example, the double arrows shown in FIG. 2 represent two opposite directions of rotation, such as clockwise or counterclockwise), and then install the main body 22 to the adjustment base 30 that has been fixed to the frame 21 of the motorbike M (as shown in FIG. 2 in conjunction with FIG. 1).

Preferably, one of the first adjustment structure 58 and the second adjustment structure 60 is a wheel portion, and the other one includes an installation space to accommodate the wheel portion. In the present embodiment, the first adjustment structure 58 is a wheel portion, and the wheel portion has a periphery provided with a plurality of protruding segments 64 and a plurality of concave segments 66, so that the appearance of the wheel portion is a gear-like structure (as shown in FIG. 2). The number of the plurality of protruding segments 64 is equal to the number of the plurality of concave segments 66, and the plurality of protruding segments 64 and the plurality of concave segments 66 are staggered with each other. In addition, the second adjustment structure 60 includes an installation space 68 (as shown in FIG. 2), and at least two protruding ribs 70 are provided in the installation space 68, and the at least two protruding ribs 70 can be respectively engaged with at least two corresponding concave segments 66 of the plurality of concave segments. Each protruding rib 70 and the protruding segments 64 on both sides of a corresponding concave segment 66 block each other, so that the main body 22 and the adjustment base 30 are engaged with each other and fixed to each other (as shown in FIG. 1).

Preferably, the adjustment base 30 further includes a shaft portion 72, and the second adjustment structure 60 further includes a shaft hole 74 connected to the installation space 68. The shaft hole 74 is configured to accommodate the shaft portion 72 (as shown in FIG. 2), so as to improve the stability and reliability during the installation of the main body 22 to the adjustment base 30.

Preferably, the foot peg assembly 20 further includes a fixing element 76 (such as a bolt, a screw, or the like), and the fixing element can further fix the main body 22 and the adjustment base 30 to each other (as shown in FIG. 1 and FIG. 2). For example, the fixing element 76 can pass through the shaft hole 74 and the installation space 68 from one side (such as the right side) of the main body 22 and be connected to the adjustment base 30 from the other side (such as the left side), but the implementation is not limited thereto.

The main body 22 has a first predetermined length L1. The first predetermined length L1 of the main body 22 can be extended to a second predetermined length L2 through the first extension portion 36 of the first extension element 24 and/or the second extension portion 38 of the second extension element 28 (as shown in FIG. 4).

It should be understood that the foot peg assembly 20 according to the embodiment of the present invention includes the following features:

1. The rider can decide whether to install the at least one extension element (such as a first extension element 24 and/or a second extension element 28) according to the needs to extend the size (such as the length) of the main body 22, so as to facilitate the support of the rider's feet. Alternatively, the foot peg assembly 20 can meet the needs of the riders with different foot sizes with the at least one extension element (such as a first extension element 24 and/or a second extension element 28).

2. The rider can rotate the main body 22 to a predetermined angle through the first adjustment structure 58 and the second adjustment structure 60, and then install the main body 22 to the adjustment base 30. According to such a configuration, for example, it is beneficial to provide foot support or pedaling when the rider would like to show a specific posture or perform on the motorbike M.

Although the present invention has been disclosed through the foregoing preferred embodiments, the embodiments are not intended to be restrictive of the invention. Therefore, the scope of patent protection sought by the applicant is defined by the appended claims.

What is claimed is:

1. A foot peg assembly, used for a motorbike, the foot peg assembly comprising:

a main body configured to be installed to the motorbike, the main body including a first predetermined portion and defining a first space;

a first extension element including a first extension portion and a first installation portion, wherein the first installation portion is configured to be installed into the first space defined by the main body, so that the first extension portion exceeds the first predetermined portion of the main body; and a cover body configured to fix the first extension element to the main body.

2. The foot peg assembly of claim 1, further comprising a second extension element, wherein:

the main body further includes a second predetermined portion and further defines a second space;

the second extension element includes a second extension portion and a second installation portion;

the second installation portion is configured to be installed into the second space defined by the main body, so that the second extension portion exceeds the second predetermined portion of the main body; and the cover is further configured to fix the second extension element to the main body.

3. The foot peg assembly of claim 2, wherein the second predetermined portion and the first predetermined portion are substantially parallel and opposite to each other.

4. The foot peg assembly of claim 2, wherein the first extension element and the second extension element are detachably installed to the main body through the first installation portion and the second installation portion respectively.

5. The foot peg assembly of claim 4, wherein:

the main body further includes an intermediate portion located between the first predetermined portion and the second predetermined portion;

the first predetermined portion and the intermediate portion define the first space therebetween for accommodating the first installation portion of the first extension element; and the second predetermined portion and the intermediate portion define the second space therebetween for accommodating the second installation portion of the second extension element.

6. The foot peg assembly of claim 5, wherein:

the cover body is detachably installed to the main body; and the first installation portion of the first extension element and the second installation portion of the second extension element are sandwiched between the main body and the cover body.

7. The foot peg assembly of claim 6, wherein the cover body, the first extension element and the second extension element are respectively provided with a plurality of anti-slip features.

8. The foot peg assembly of claim 2, wherein:

the first installation portion and the second installation portion have substantially the same contour, so that the first installation portion and the second installation portion are able to be alternately installed to the first space and the second space.

9. The foot peg assembly of claim 1, further comprising an adjustment base including a first connecting portion and a second connecting portion, wherein:

the first connecting portion is configured to be connected to the motorbike;

the second connecting portion includes a first adjustment structure;

the main body further includes a second adjustment structure; and the first adjustment structure and the second adjustment structure match each other, so that the second adjustment structure of the main body engages with the first adjustment structure at a predetermined angle.

10. The foot peg assembly of claim 9, wherein:

the first adjustment structure is a wheel portion;

the wheel portion has a periphery provided with a plurality of protruding segments and a plurality of concave segments;

the plurality of protruding segments and the plurality of concave segments are staggered with each other;

the second adjustment structure includes an installation space;

at least two protruding ribs are provided in the installation space; and the at least two protruding ribs are configured to respectively engage with at least two corresponding concave segments of the plurality of concave segments.

11. The foot peg assembly of claim 2, wherein the first installation portion and the second installation portion have substantially the same U-shaped contour.

12. A foot peg assembly, used for a motorbike, the foot peg assembly comprising:

a main body configured to be installed to the motorbike, the main body including a first predetermined portion, a second predetermined portion, and an intermediate portion located between the first predetermined portion and the second predetermined portion;

a first extension element including a first extension portion and a first installation portion;

a second extension element including a second extension portion and a second installation portion; and a cover body configured to fix the first extension element and the second extension element to the main body, wherein:

the first predetermined portion and the intermediate portion define a first space therebetween for accommodating the first installation portion of the first extension element;

the first installation portion is installed into the first space and clamped between the intermediate portion and the first predetermined portion, so that the first extension element exceeds the first predetermined portion;

the second predetermined portion and the intermediate portion define a second space therebetween for accommodating the second installation portion of the second extension element;

the second installation portion is installed into the second space and clamped between the intermediate portion and the second predetermined portion, so that the second extension element exceeds the second predetermined portion; and the first installation portion and the second installation portion have substantially the same contour, so that the first installation portion and the second installation portion are able to be alternately installed to the first space and the second space.

13. The foot peg assembly of claim 12, wherein the second predetermined portion and the first predetermined portion are substantially parallel and opposite to each other.

14. The foot peg assembly of claim 12, wherein the cover body, the first extension element and the second extension element are respectively provided with a plurality of anti-slip features.

15. The foot peg assembly of claim 12, wherein the first installation portion of the first extension element and the second installation portion of the second extension element are sandwiched between the main body and the cover body.

16. The foot peg assembly of claim 12, wherein the first installation portion and the second installation portion have substantially the same U-shaped contour.

\* \* \* \* \*